Aug. 21, 1951 J. VANCOPPENOLLE Re. 23,401

DEVICE FOR THE SUSPENSION OF VEHICLES

Original Filed July 19, 1939 2 Sheets-Sheet 1

INVENTOR
JEAN VANCOPPENOLLE
BY Louise O'Neil
ATTORNEY

DEVICE FOR THE SUSPENSION OF VEHICLES

Original Filed July 19, 1939 2 Sheets-Sheet 2

INVENTOR
JEAN VANCOPPENOLLE
BY Louise O'Neil
ATTORNEY

Reissued Aug. 21, 1951

Re. 23,401

UNITED STATES PATENT OFFICE 23,401

DEVICE FOR THE SUSPENSION OF VEHICLES

Jean Vancoppenolle, Caen, France; vested in the Attorney General of the United States Original No. 2,353,603, dated July 11, 1944, Serial No. 285,256, July 19, 1939. Application for reissue October 10, 1947, Serial No. 779,091. In France August 5, 1938

1 Claim. (Cl. 267—19)

The invention relates to the system of suspension for vehicles, in particular for automobile vehicles, according to which, to the usual suspension which comprises a resilient device and a braking device, is added an auxiliary suspension which introduces an additional resilient resistance effect that is greater as the main suspension is farther away from its position of equilibrium.

The invention has for its object a device for such an auxiliary suspension, which is characterized by a multiple leaf spring, the deformations of which are reduced relatively to those of the main suspension.

Under these conditions, the auxiliary suspension may be obtained by means of a single multiple leaf spring or of a single set of multiple leaf springs.

In a number of cases, a spring is used wherein the leaves are arranged equally on either side of the main leaf or a set of such springs is used; the auxiliary suspension acts in this case in the same manner for the deformations of the main suspension in both directions from the position of equilibrium.

In other cases, the leaves are less in number, or even completely eliminated, on one of the sides of the main leaf, so that the auxiliary suspension acts with a force which is variable according to the direction of the deformation of the suspension from its position of equilibrium.

A particularly simple manner of obtaining the reduction of the deformations of the auxiliary suspension consists in attaching same at a point of a lever interposed between the suspended part and the unsuspended part of the vehicle.

Hereinafter, some embodiments of a device according to the invention will be described by way of examples. Reference will be had to the accompanying diagrammatical drawings in which.

Figure 1:
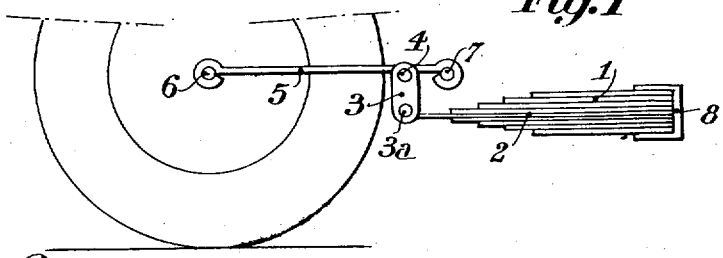
Fig. 1 is a side view of a first main form of the invention.

In all these embodiments, the device according to the invention comprises, as diagrammatically shown on the Fig. 1, the three following essential organs:

(1°) A multiple leaf spring, 1, the main leaf, 2, of which is rectilinear and is associated on both sides with leaves of progressively reduced length;

(2°) A rigid lever, 5;

(3°) A shackle, 3, connecting the end of the main leaf, 2, to the lever, 5, in a determined point 4, to ensure the demultiplication of said spring.

The shackle may be replaced by a ball and socket joint if said spring does not work in the same plane as the rigid lever.

Referring to Fig. 1, the auxiliary suspension according to the invention comprises a multiple leaf spring 1, the leaves of which are arranged on both sides of a main leaf 2 which is attached, at one of its ends, to the end 3ª of a shackle 3. Said shackle is pivoted, by its other end 4, at an intermediate point of a lever 5 interposed between a point 6 of the unsuspended part of the vehicle and a point 7 of the suspended part. The ends of the leaves of the spring 1, which are opposite to the end of the main leaf 2 attached to the shackle, 3, are rigidly secured to the suspended part of the vehicle, for example by means of a half-collar 8.

For a vehicle, one or a plurality of leaf springs 1 may be provided, arranged as just described. This auxiliary suspension adds its effects to those of the main suspension of the vehicle, which main suspension is retained.

When there is a deformation of the main suspension, producing a relative movement between the unsuspended part and the suspended part of the vehicle, the ends of the leaves of the spring 1 which are clamped by the half-collar 8 participate in the movement of the suspended part, whereas the end of the main leaf 2 attached to the shackle 3 undergoes substantially the movement of the intermediate point 4 of the lever 5. If the movements are referred to the suspended part of the vehicle considered as a reference system, it will be seen that the deformations of the main suspension are materialized by the movement of the point 6 about the axis of rotation 7 which is in this case fixed, whereas the deformation of the auxiliary suspension is materialized by the movement of the point 4, the amplitude of which is reduced relatively to the movement of the point 6 in the ratio of the distances of the points 4 and 6 from the axis 7.

The small amplitude of the movements of the point of attachment 3ª of the main leaf 2 enables a spring to be used in which the leaves are arranged on both sides of the main leaf, without untimely breaks occurring.

On the other hand, the auxiliary suspension acts simultaneously whatever be the direction and the amplitude of the deformation of the main suspension.

Figure 2:
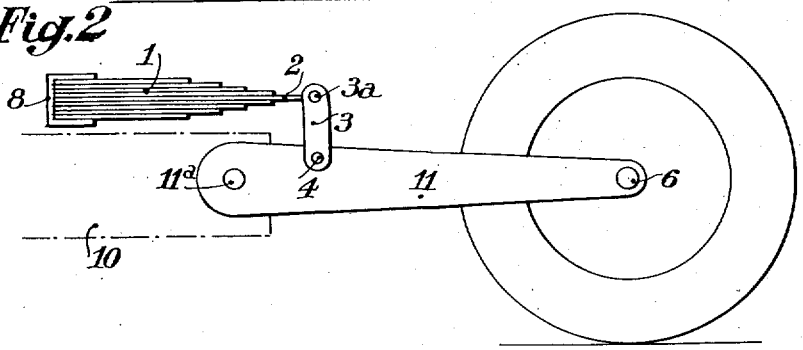
Fig. 2 is a side view of a modification.

Fig. 2 shows a modification in the case in which the suspended part 10 of the vehicle is connected to the unsuspended part, which is represented by the point 6, by means of an arm 11. In this case, said arm advantageously performs the function of the lever 5, thereby reducing to a minimum the number of members to be added to a vehicle in order to equip same according to the invention.

Figure 3:
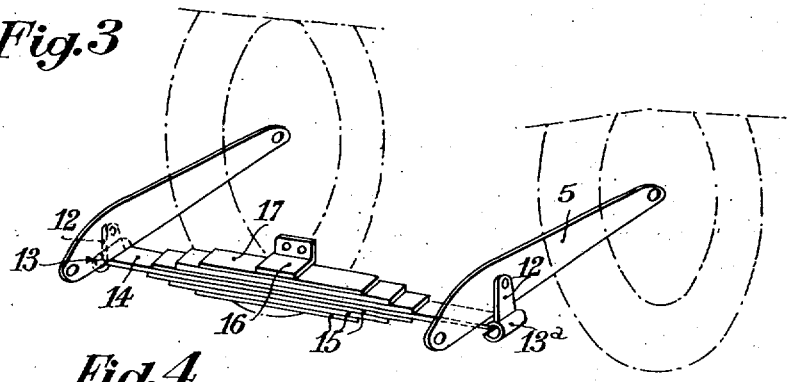
Fig. 3 is a perspective view of another modification of the form according to Fig. 1.

The spring 1 and the lever 5 may be arranged in planes extending in the same direction, as hitherto described, or in planes extending in different directions. Fig. 3 shows a modification in which said planes are transverse. The levers 5 carry shackles 12 between the ends 13 and 13a of which is attached a main leaf 14. On both sides of said leaf are placed secondary leaves 15, so as to form a so-called "complete" spring. The central part of the spring 17 thus formed is rigidly secured, for example by means of the bracket 16, to the suspended part of the vehicle.

Figure 4:
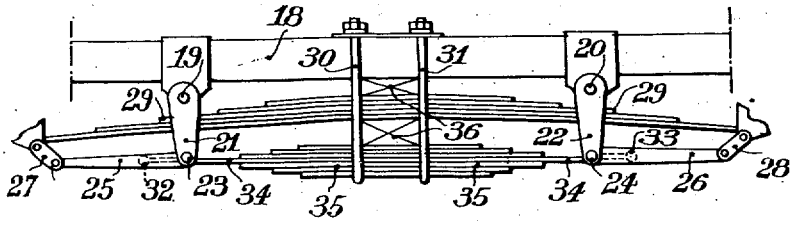
Fig. 4 is a front view of a second main form or modification.

In the second main form or modification shown in Fig. 4, the suspended part of the vehicle is provided with a cross-piece 18 to which are pivoted, on both sides of the axis $x$—$x$, by means for example of so-called "Silentbloc" devices 19 and 20, supporting arms 21 and 22. At the ends 23 and 24 of said supporting arms are pivoted arms 25 and 26 which carry at their ends shackles 27 and 28 respectively. To the shackles 27 and 28 are attached the ends of a leaf spring 29 forming the resilient device of the main suspension and the central part of which is fixed, by means of the clamps 30 and 31, to the cross-piece 18.

At intermediate points 32 and 33 of the arms 21 and 22 is attached the main leaf 34 of a spring 35 which forms the auxiliary suspension according to the invention and the central part of which is fixed to the suspended part of the vehicle, which is represented by the cross-piece 18, by means of the clamps 30 and 31 and of the spacing block 36.

Figure 5:
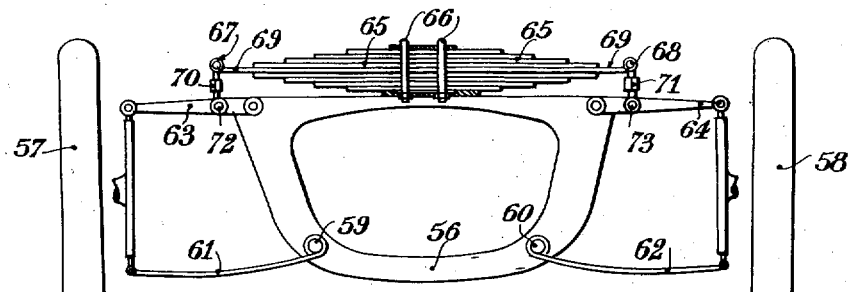
Fig. 5 is a diagrammatical front view of another main form or modification.

In the modification of Fig. 5, which shows a diagrammatical transverse section of a vehicle, the suspended part of same is represented by a shell or cradle 56 connected to the unsuspended part, including the wheels 57 and 58, by means of torsion bars 59 and 60 which form the main suspension. Said torsion bars are connected to the wheels 57 and 58 by means of pivoting arms 61 and 62. The connection of the wheels 57 and 58 to the shell 56 is completed by levers 63 and 64 which are pivoted at their ends, respectively to the suspended part and to the unsuspended part of the vehicle. According to the invention, at least one of the wheel trains of the vehicle, for example the front wheel train, is equipped with a leaf spring 65 which is fixed at its central part on the shell 56 by means of clamps 66 and the ends 67 and 68 of the main leaf 69 of which are mounted, by means of preferably adjustable shackles 70 and 71, at intermediate points 72 and 73 of the levers 63 and 64.

Figure 6:
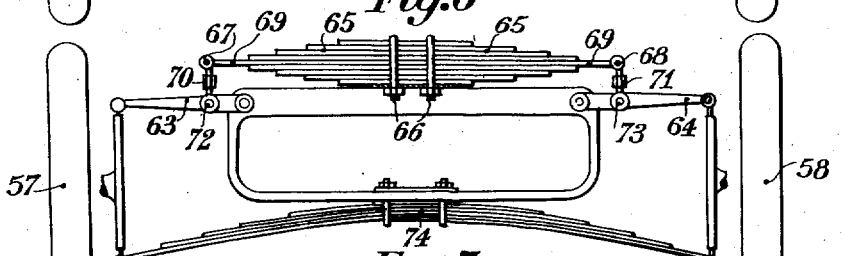
Fig. 6 is a similar modification.

In the modification according to Fig. 6, the arrangement is similar; however, the main suspension is formed by a leaf spring 74.

Figure 7:
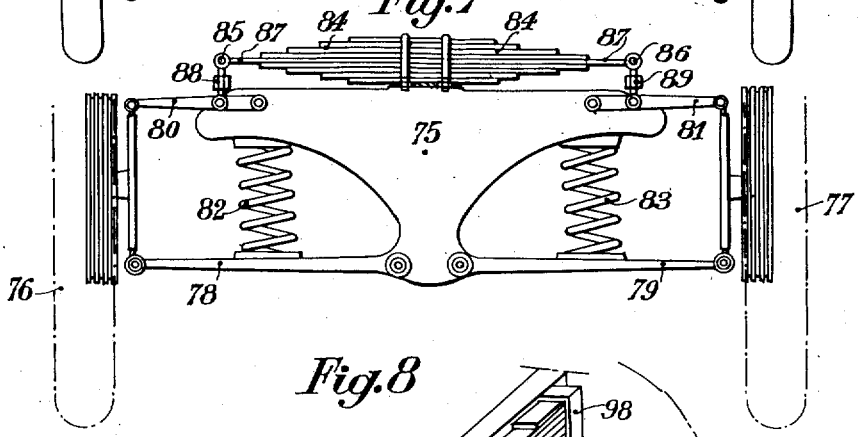
Fig. 7 is a front view of a further modification.

In the modification of Fig. 7, which is similar, the front cross-piece 75 which is secured to the chassis forming the suspended part of the vehicle is connected to the wheels 76 and 77 by means of lower arms 78 and 79 and of upper arms 80 and 81; and helical springs 82 and 83, with shock-absorbers, are interposed between the cross-piece 75 and the lower arms 78 and 79 and form the main suspension. The auxiliary suspension according to the invention is formed by a leaf spring 84 which is fixed at its central part on the cross-piece 75 and the ends 85 and 86 of the main leaf 87 of which are mounted, with the interposition of shackles 88 and 89 which are preferably adjustable, at intermediate points of the arms 80 and 81.

Figure 8:
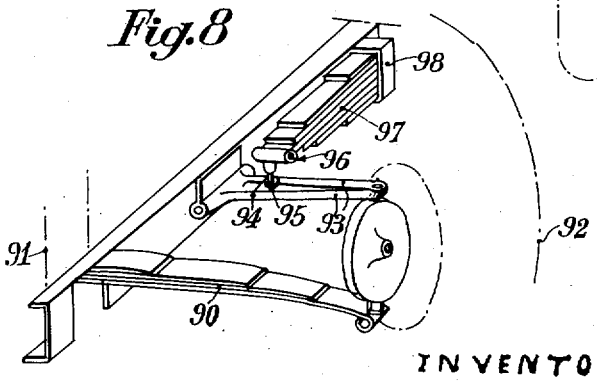
Fig. 8 is a perspective view of still another modification.

In the modification of Fig. 8, the main suspension comprises a transverse leaf spring 90 interposed between the suspended part 91 of the vehicle and the wheel 92. A triangular member 93 completes the connection between the wheel 92 and the suspended part 91. At an intermediate point 94 of the member 93 is mounted, with the interposition of a shackle 95, the end of the main leaf 96 of a half leaf-spring 97 which is fixed on the other hand by means of the collar 98 in the suspended part of the vehicle, said spring 97 forming the auxiliary suspension.

I claim:

In a suspension system for vehicles having a chassis embodying a frame: a main suspension device interposed between said frame and the unsuspended part of said vehicle and comprising primary elastic means fixed to a portion of said frame; a pair of levers spaced at both sides transversely with respect to the vehicle, the ends of each lever being articulated to a point of said unsuspended part and to a point of said frame; an auxiliary suspension device, the effects of which are superimposed upon those of the main suspension device and including secondary elastic means comprising at least a multiple leaf spring fixed to a portion of said frame and composed of a carrier plate against which are applied on both sides two bundles of leaves; two rigid shackles, each of which is articulated to the end of said multiple leaf spring and to one of said levers in points situated between the above said articulations of said levers and in such a manner that, when the main suspension device suffers deformation from its position of equilibrium, the auxiliary suspension device suffers a deformation smaller than that of the main suspension.

JEAN VANCOPPENOLLE.

REFERENCES CITED

The following references are of record in the file of this patent:

UNITED STATES PATENTS

| Number | Name | Date |
|---|---|---|
| 2,171,469 | Boxan | Aug. 29, 1939 |

FOREIGN PATENTS

| Number | Country | Date |
|---|---|---|
| 733,617 | France | July 12, 1932 |
| 787,762 | France | July 16, 1935 |
| 819,092 | France | June 28, 1937 |
| 386,285 | Germany | Dec. 18, 1923 |
| 449,455 | Great Britain | June 26, 1936 |
| 347,031 | Italy | Mar. 15, 1937 |